(12) United States Patent
Pollack et al.

(10) Patent No.: US 8,887,043 B1
(45) Date of Patent: Nov. 11, 2014

(54) PROVIDING USER FEEDBACK IN PROJECTION ENVIRONMENTS

(75) Inventors: Joshua Pollack, San Francisco, CA (US); Edward Dietz Crump, Santa Cruz, CA (US); Sankara Narayana Hemanth Meenakshisundaram, San Jose, CA (US); Christopher Coley, Morgan Hill, CA (US)

(73) Assignee: Rawles LLC, Wilmington, DE (US)

( * ) Notice: Subject to any disclaimer, the term of this patent is extended or adjusted under 35 U.S.C. 154(b) by 0 days.

(21) Appl. No.: 13/351,983

(22) Filed: Jan. 17, 2012

(51) Int. Cl.
| | |
|---|---|
| G06F 3/048 | (2013.01) |
| G06F 3/0481 | (2013.01) |
| G06F 3/04815 | (2013.01) |
| G06F 3/04842 | (2013.01) |
| G06F 3/04886 | (2013.01) |
| G06F 3/04895 | (2013.01) |
| G06F 3/0354 | (2013.01) |
| G06F 3/03545 | (2013.01) |
| G06F 3/0346 | (2013.01) |

(52) U.S. Cl.
USPC ........... 715/702; 715/810; 345/108; 345/156; 345/418

(58) Field of Classification Search
CPC ... G06F 3/048; G06F 3/0481; G06F 3/04815; G06F 3/04842; G06F 3/04886; G06F 3/04895; G06F 2203/04802; G06F 3/0354; G06F 3/03545; G06F 3/0346
USPC ........... 715/702, 810; 345/168, 156, 418, 108
See application file for complete search history.

(56) References Cited

U.S. PATENT DOCUMENTS

| | | | |
|---|---|---|---|
| 7,418,392 B1 | 8/2008 | Mozer et al. | |
| 7,720,683 B1 | 5/2010 | Vermeulen et al. | |
| 7,774,204 B2 | 8/2010 | Mozer et al. | |
| 2002/0140633 A1* | 10/2002 | Rafii et al. | 345/8 |
| 2006/0161870 A1* | 7/2006 | Hotelling et al. | 715/863 |
| 2007/0013716 A1* | 1/2007 | Kjeldsen et al. | 345/594 |
| 2008/0143975 A1* | 6/2008 | Dennard et al. | 353/42 |
| 2009/0251422 A1* | 10/2009 | Wu et al. | 345/173 |
| 2010/0199232 A1* | 8/2010 | Mistry et al. | 715/863 |
| 2010/0251176 A1* | 9/2010 | Fong et al. | 715/821 |
| 2011/0181522 A1* | 7/2011 | Rendahl | 345/173 |
| 2012/0188285 A1* | 7/2012 | Friedlander et al. | 345/660 |
| 2012/0223885 A1 | 9/2012 | Perez | |

FOREIGN PATENT DOCUMENTS

WO    WO2011088053 A2    7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

*Primary Examiner* — Ting Lee
(74) *Attorney, Agent, or Firm* — Lee & Hayes, PLLC (57) ABSTRACT

Systems and techniques for providing feedback to users within an environment that interact with user interfaces (UIs) that are projected within the environment. For instance, the systems and techniques may project a UI that includes one or more selectable portions, such as keys, icons, sliders, dials, or any other type of control. After projecting the UI, the systems and techniques may identify the user attempting to interact with the UI. In response, the systems and techniques may provide feedback to the user indicating that the user has engaged the UI. For instance, the systems and techniques may visually alter the projected UI, may output a sound via one or more speakers within the environment, or may provide the feedback in any other manner.

32 Claims, 10 Drawing Sheets

PROVIDING USER FEEDBACK IN PROJECTION ENVIRONMENTS

BACKGROUND

Augmented reality environments allow interaction among users and both real-world objects and virtual or digital objects. To achieve these augmented reality environments, some systems may project content onto walls or other physical objects within an environment. Increasing a user's ability to interact with this projected content may, in turn, increase the functionality and desirability of these augmented reality environments.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This document describes, in part, systems and techniques for providing feedback to users within an environment that interact with user interfaces (UIs) that are projected within the environment. For instance, a system within the environment may project a UI that includes one or more selectable portions, such as keys, icons, sliders, dials, or any other type of control. In one example, the system projects a keyboard or keypad that includes different letters, symbols, and/or numbers that a user may select. In another example, the system projects a slider bar that includes a slider that the user may slide along the bar. In yet another example, the system projects a menu that includes different selectable radio buttons, drop-down menus, or the like. In still other examples, the system may project any other sort of graphical user interface with which a user may interact.

After projecting the UI, the system or another system within the environment may identify the user attempting to interact with the UI. For instance, the system may include a camera that images the environment and, with use of the captured images, identifies the user attempting to interact with the UI using physical gestures. In one example, the system or another system projects structured light within the environment and the camera identifies distortion in the structured light to identify objects, surfaces, users, and user gestures within the environment. By identifying deformations in the structured light in this manner, the system may determine when a user is making a physical gesture in an attempt to interact with the projected UI. In some instances, the systems may utilize the structured light techniques described in detail in pending U.S. patent application Ser. No. 12/977,924, filed on Dec. 23, 2010 and entitled "Characterization of a Scene with Structured Light", which is incorporated in its entirety herein by reference.

For instance, if the system projects the UI onto a particular wall within the environment, the system may identify when the user gestures (e.g., with a hand or finger of the user or with another selection tool) towards the particular wall. For instance, a user may begin pointing at the particular wall with the user's finger. In response to identifying that the user is attempting to interact with the projected UI, the system may provide feedback to the user indicating that the user has engaged the UI. For instance, the system may visually alter the projected UI, may output a sound via one or more speakers within the environment, or may provide the feedback in any other manner.

In one particular example, the projected UI includes multiple selectable portions, such as different selectable keys, icons, or the like. In this example, as the user moves his finger towards the particular wall on which the system projects the UI, the system may identify (using the information captured by the camera) a trajectory of the user's finger toward the particular wall. That is, the system may identify a location of the user's finger (e.g., a location of a centroid of the user's fingertip) over multiple different frames and may connect these points to identify a trajectory of the user's finger.

The system may then extrapolate this trajectory onto a particular location on the wall and may map this location to a particular selectable portion of the UI. For instance, the system may compare the location determined from extrapolating the trajectory of the user's finger onto the wall with a known location at which the system projects the UI to identify which portion of the UI the user is currently pointing at. In another example, the system also utilizes information captured by the camera to identify the location at which the UI is projected within the environment. The system then compares the location determined from extrapolating the trajectory of the user's finger onto the wall with the information regarding the location of the projected UI. With this comparison, the system then identifies a portion of the UI that the user currently points at.

After identifying which portion of the UI the user is pointing at, the system may provide feedback that highlights this portion. For instance, the system may provide feedback to the user indicating that he is in position to select this portion. The system may provide this feedback visually, audibly, using haptic feedback, or in any other manner. For instance, the system may alter the projection of the UI to enlarge the portion of the UI that the user is currently pointing at, may change a color of that portion, may gray out other portions of the UI that the user is not pointing at, or may provide this visual feedback in any other manner. Additionally or alternatively, the system may output an audible indication of the particular portion that the user is currently pointing at.

To provide one example, envision that the system projects a keyboard that includes multiple selectable keys onto the wall. When the system detects the user attempting to engage this keyboard by moving a selection tool (e.g., a hand, finger, stylus, etc.) towards the wall, the system may identify the trajectory of the selection tool and may map this trajectory to a particular key of the keyboard. In response, the system may provide feedback to the user indicating the key that the user is currently in position to select. For instance, the system may alter the projection to enlarge that key relative to other keys of the keyboard, may change a color of the key, may grey out the other keys of the keyboard, or may visually provide this feedback in any other manner. In addition or in the alternative, the system may output an audible indication of the key. For instance, if the user is in position to select the "A" key, the system may output "A" on one or more speakers of the system or one or more speakers within the environment that the system is able to control.

In yet another example, the UI may provide feedback at different levels of granularity. For instance, as the user begins pointing at the wall on which the system projects the keyboard, the system may first identify a block of multiple keys towards which the user is pointing and may provide feedback indicating this block of keys. For instance, the system may enlarge this block of keys, may change their color, or visually alter this block of keys or other blocks of keys in any other manner. Furthermore, as the user's finger or other selection tool continues to move towards the wall, the system may extrapolate the user's trajectory onto a particular key of the accentuated block of keys if the user's trajectory remains directed within that block. For instance, the system may enlarge one particular key of the block of keys in this example. Alternatively, if the user changes the trajectory of the selection tool to a different block of keys of the keyboard, the system may then provide feedback indicating that the user's trajectory is now directed to a different block of keys and, hence, may enlarge or otherwise visually alter this block of keys.

In the examples described above, once the system has provided feedback to the user indicating that the user is in position to select a particular portion (e.g., a key) of the projected UI, the user may thereafter continue to move the selection tool towards the wall to make an actual selection of that portion. For instance, if the user's finger is headed toward the "A" key on the projected keyboard, the system may first enlarge the "A" key and then accept a user's selection of this key if the user continues moving his finger towards the "A" key. After identifying the selection, the system may provide feedback to the user indicating that the selection has been accepted and may also cause performance of an action associated with this selection.

For example, if the user selects an "A" key, the system may visually display the letter "A" within a text box in which the user is typing. This text box may be projected on the same wall or a different wall or may be displayed in any other location (e.g., on a different display device within the environment, etc.). In addition or in the alternative, the system may also alter the projection of the "A" key to indicate that the system has accepted the selection, may output a sound on one or more speakers (e.g., the sound of a key press on a physical keyboard), or may provide feedback indicating acceptance of the selection in any other manner.

Using the techniques described herein, a user is able to more effectively interact with UIs projected within an environment. Specifically, when a user gestures towards a projected UI, the system provides feedback, indicating the portion of the UI that the user is in position to select. If the user is in the desired position (e.g., is in position to select an icon that he wishes to select), then the user may continue with his gesture towards the wall. If, however, the user is not in position to select the desired key—as indicated by the feedback provided by the system—then the user may move his gesture left, right, up, or down until the system indicates that he is in position to the select the desired icon. For instance, if the system currently enlarges an "A" key on a projected QWERTY keyboard, but the user wishes to select a "T" key, then the user may move his finger up and to the right until the system enlarges the "T" key. At that point, the user may move his finger towards the wall for the purpose of selecting the "T" key.

In addition to allowing a single user within an environment to interact with projected UIs, the techniques described herein apply equally to multi-user environments. That is, the systems described herein may project multiple UIs and/or may allow multiple users to interact with one or more different UIs. In some instances, a system as described herein determines which user of multiple different users within an environment is attempting to engage a particular UI and, in response, the system interprets the gestures of this user for the purpose of providing feedback to the user and accepting selections on the UI requested by the user.

The systems described herein may determine which user of multiple users is attempting to interact with a UI in multiple different ways. For instance, the systems may identify, for each user within an environment, an orientation of a head and/or body of the respective user. The systems may also identify visual and/or audible gestures made by these users. The systems may then deduce that a user that is looking at a particular UI (determined with reference to orientation information) and that is making a gesture towards or regarding a particular UI is in fact attempting to interact with the UI. In still other instances, the systems may also take into account a user's distance from the UI in addition to an array of other factors.

As described herein for illustration and not by way of limitation, the projector(s) and the camera(s) may be incorporated into a single unit, designated as an augmented reality functional node (ARFN) in some instances. In other implementations, other combinations of elements such as projectors, cameras, microphones, ultrasound transducers, depth sensing cameras, weight sensors, touch sensors, tactile output devices, and so forth may be also be present within or coupled to the ARFN. For convenience, and not by way of limitation, some of the examples in this disclosure refer to the use of structured light for the characterization of the physical environment and to identify a user's gestures within the environment. However, in addition to or in place of structured light, other techniques may be used such as facial recognition techniques, depth sensing techniques, light detection and ranging (LIDAR), optical time-of-flight, ultrasonic ranging, stereoscopic imaging, radar, and so forth either alone or in combination with one another.

EXAMPLE ENVIRONMENT

Figure 1:
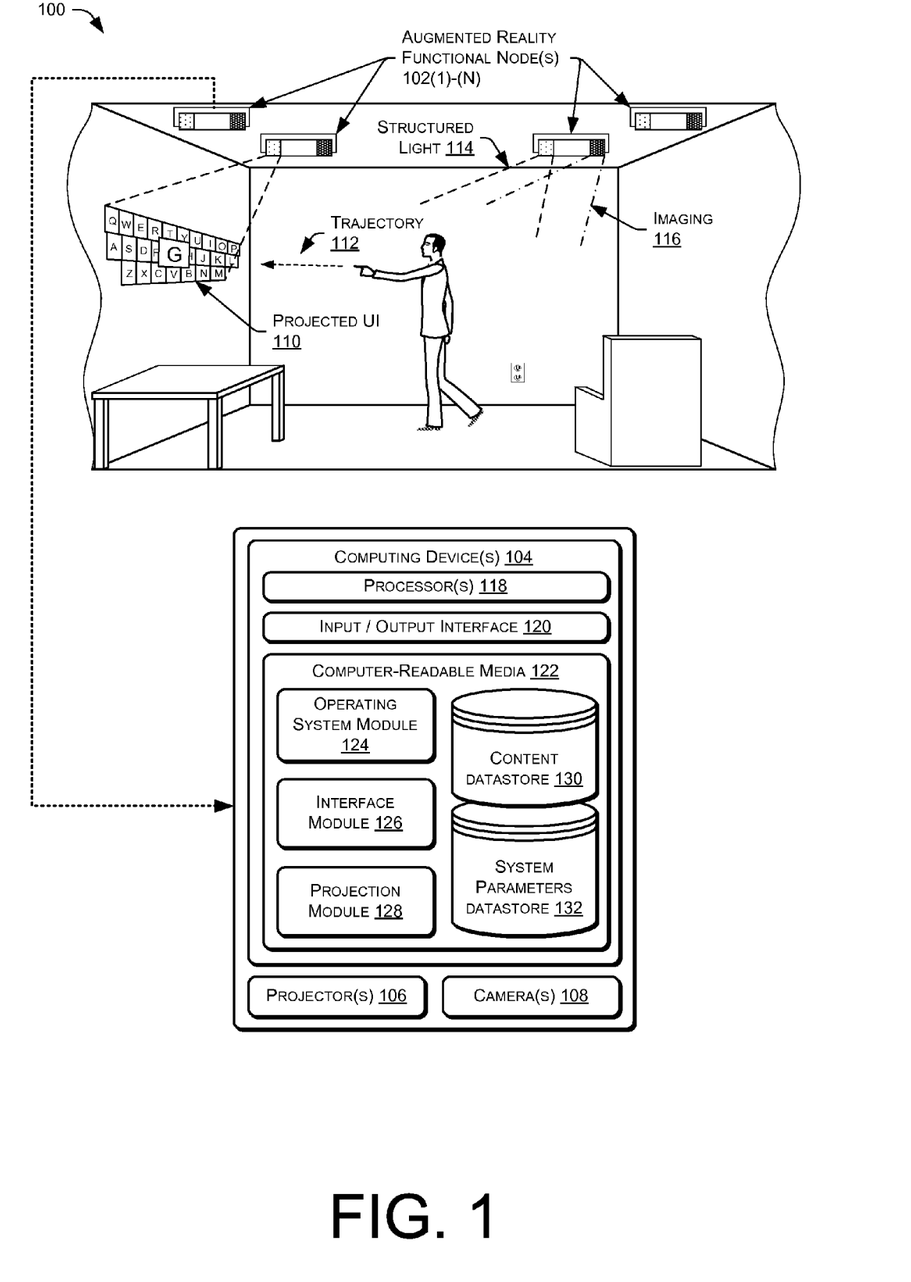
FIG. 1 illustrates an environment that includes an augmented reality functional node (ARFN) that projects a user interface (UI) onto a surface within the environment. When a user attempts to interact within the UI, the ARFN provides feedback to the user indicating that the UI has been engaged.

FIG. 1 shows an illustrative augmented reality environment 100 that includes one or more augmented reality functional nodes (ARFNs) 102(1), ..., 102(N) (collectively referred to as "the ARFN 102" in some instances). The ARFN 102 may be configured to perform the techniques described above. While the environment illustrates four nodes, in some instances an environment may include any number of one or more nodes stationed in different locations throughout the environment. Furthermore, it is to be appreciated that the techniques described herein may be performed by a single ARFN, by a collection of any number of ARFNs, or by any other devices or combinations of devices.

As illustrated, each ARFN 102 may include one or more computing devices 104, as well as one or more projectors 106 that, when active, project content onto any surface within the environment 100. The projected content may include electronic books, videos, images, interactive menus, or any other sort of visual content.

For instance, the user within the environment may request that the ARFN 102 project a particular electronic book that the user wishes to read. In response, the ARFN 102 may project the book onto a projection surface within the environment. In another example, the user may request that the ARFN 102 project a particular movie or show that the user wishes to watch. In response, the ARFN 102 may obtain the content (locally or remotely) and may project the content onto a surface in the environment. In yet another example, the ARFN 102 may be configured to project a user interface (UI), such as a keyboard, a slider bar, a virtual remote control to operate a television within the environment 100, or any other type of UI.

As discussed in further detail below, the ARFN 102 may include one or more cameras 108 that may capture images of the illustrated user operating the UI and, in response, the ARFN 102 may provide feedback to the user and may cause performance of actions corresponding to the user's selection. For instance, when the ARFN 102 projects a remote control, the ARFN 102 may provide feedback to the user indicating which button(s) a user is in position to select, may identify a user's selection (e.g., a selection to power on the television) and, in response, may operate the television according to identified selection. While a few examples have been given, it is to be appreciated that the ARFN 102 may project any other sort of content within the environment 100.

In the illustrated example, the projector 106 of the ARFN 102 projects a UI 110 onto a wall of the environment 100. While this example illustrates the UI 110 as a keyboard, the projector 106 may project any other type of UI within the environment as discussed above. As illustrated, a user within the environment currently points toward the location at which the UI 110 is projected. At a high level, one or more of the ARFNs 102(1)-(N) within the environment 100 may identify a current trajectory 112 of the user's gesture, may map this trajectory 112 to a particular portion of the UI, and, in response, may provide feedback to the user indicating that the user is in position to select this particular portion. For instance, the ARFN 102 may instruct the projector 106 to enlarge the particular portion, to change a color of the particular portion, to gray out other portions of the UI, to provide an audible indication of the portion, or to provide this feedback in any other manner.

In the illustrated example, the trajectory 112 is directed toward the "G" key of the projected UI 110 and, as such, the projector 106 has enlarged this key for the purpose of providing feedback to the user. If the user moves his hand further towards the "G" key on the projected UI 110, the ARFN 102 may interpret the user's gesture as a selection of the "G" key, may provide feedback indicating that the ARFN 102 has accepted the selection, and may cause performance of an action corresponding to the selection.

In this example, one of the ARFNs 102 within the environment is shown to project structured light 114 as well as image 116 the environment 100 for the purpose of identifying distortions in the structured light 114. While FIG. 1 illustrates one ARFN projecting this structured light and imaging the environment to identify the distortions, in some implementations one or more other ARFNs may additionally or alternatively perform these functions. In either instance, by imaging the environment in this manner, the ARFNs 102 may identify the user's gestures within the environment for the purpose of determining when to provide feedback to the user and when to interpret a user's gesture as a selection of a portion of the projected UI 110.

As illustrated, the computing device 104 of the example ARFN 102 includes one or more processors 118, an input/output interface 120, and computer-readable media 122. The processors 118 may be configured to execute instructions, which may be stored in the computer-readable media 122 or in other computer-readable media accessible to the processors 118.

Figure 2:
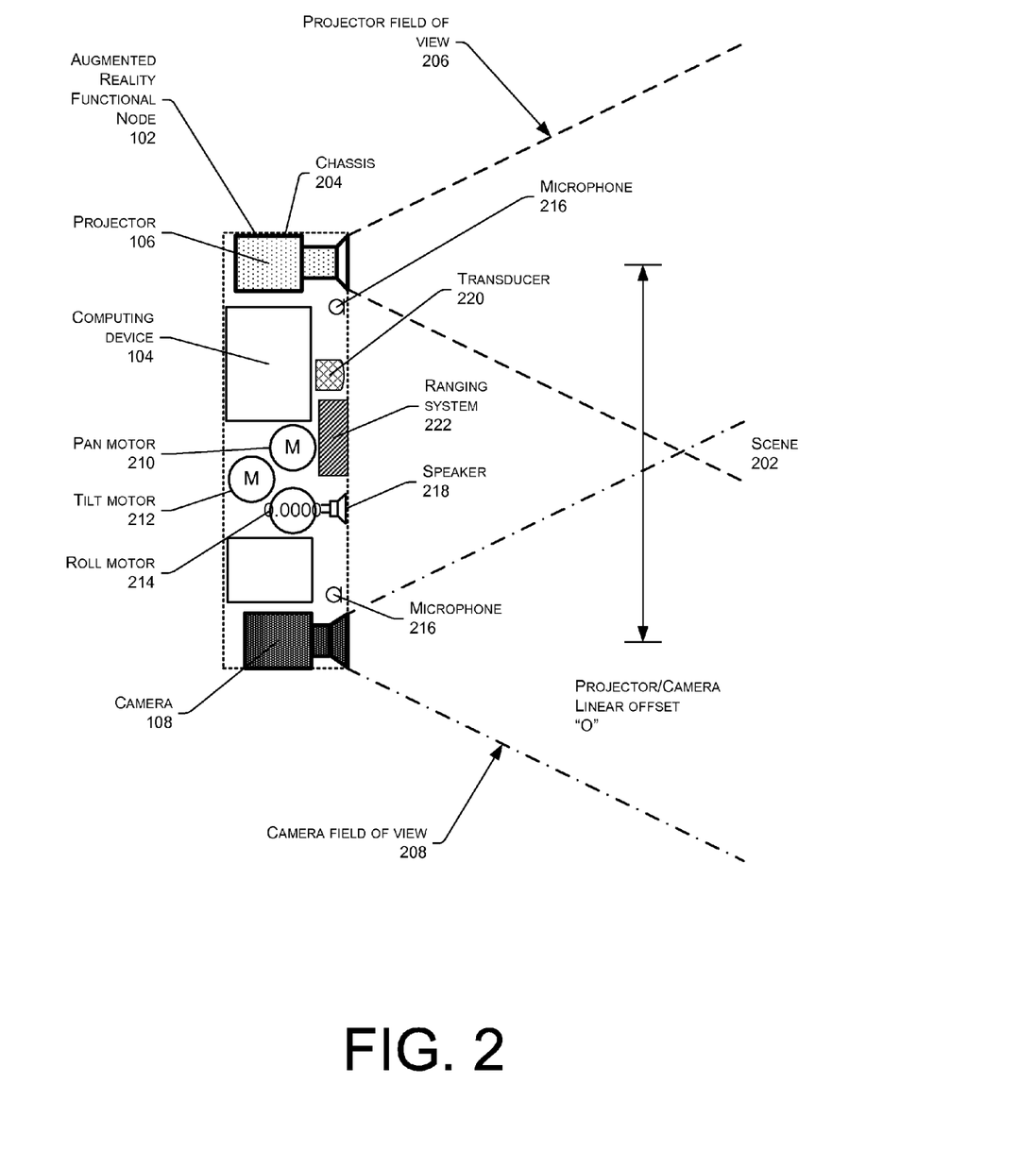
FIG. 2 illustrates an example ARFN that includes a computing device, a projector, a camera, and other selected components for projecting a UI within an environment and providing feedback to a user attempting to interact with the UI, as illustrated in FIG. 1.

The input/output interface 120, meanwhile, may be configured to couple the computing device 104 to other components of the ARFN 102, such as the projector 106, the camera 108, microphones, other ARFNs 102, other computing devices, and so forth. The coupling between the computing device 104 and the devices may be via wire, fiber optic cable, wireless connection, or the like. Furthermore, while FIG. 1 illustrates the computing device 104 as residing within a housing of the ARFN 102, some or all of the components of the computing device 104 may reside at another location that is operatively connected to the ARFN 102. In still other instances, certain components, logic, and/or the like of the computing device 104 may reside within the projector 106 or the camera 108. Therefore, it is to be appreciated that the illustration of the ARFN 102 of both FIGS. 1 and 2 is for illustrative purposes only, and that components of the ARFN 102 may be configured in any other combination and at any other location.

The computer-readable media 122, meanwhile, may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device 104. The computer-readable media 122 may reside within a housing of the ARFN, on one or more storage devices accessible on a local network, on cloud storage accessible via a wide area network, or in any other accessible location.

The computer-readable media 122 may store several modules, such as instructions, datastores, and so forth that are configured to execute on the processors 118. For instance, the computer-readable media 122 may store an operating system module 124, an interface module 126, a projection module 128, a content datastore 130, and a system parameters datastore 132.

The operating system module 124 may be configured to manage hardware and services within and coupled to the computing device 104 for the benefit of other modules. The interface module 126, meanwhile, may be configured to receive and interpret commands received from users within the environment 100. For instance, the interface module 126 may analyze and parse images captured by the camera 108 to identify gestures made by users within the environment 100. In response to identifying a predefined gesture, the interface module 126 may interpret the gesture and cause the ARFN 102 to perform a corresponding action.

For instance, if a user within the environment 100 makes a gesture requesting that the ARFN 102 project a certain piece of content, then the interface module 126 may interpret the gesture and cause the projection module 128 to project the content via the projector 106. In other instances, the interface module 126 identifies commands audibly issued by users within the environment and captured by one or more microphones of the ARFN 102. In still other instances, the interface module 126 allows users to interface and interact with the ARFN 102 in any way, such as via physical controls, and the like.

In addition, the interface module 126 may identify trajectories of user gestures and cause the ARFN 102 to provide feedback to the users, with the feedback indicating portions of projected UIs that the users are in position to select. For instance, the interface module 126 may identify the trajectory 112 of the illustrated user's gesture and, in response, may instruct the projection module 128 to enlarge the "G" key on the projected UI 110. Furthermore, the interface module 126 may identify when the trajectory 112 of the user's continues to move towards the "G" key and, in response, the interface module 126 may interpret the gesture as a selection of the "G" key. The module 126 may then instruct the projection module 128 to alter this key as projected in a particular manner to indicate acceptance of the selection and may cause performance of an action corresponding to the selection.

The content datastore 130, meanwhile, stores content for outputting within the environment. For instance, the content datastore may store applications and data for use within the environment 100. The projection module 128 may access the content datastore 130 in order to project requested content within the environment 100. For instance, when the user requests that the ARFN 102 project a particular electronic book, the projection module 128 may access the content datastore 130 to retrieve and cause projection of the desired electronic book.

Finally, the computer-readable media 122 may store the system parameters datastore 132, which is configured to maintain information about the state of the computing device 104, the projector 106, the camera 108, and so forth. For example, and as described in detail below, the ARFN 102 may be configured to pan and tilt for the purpose of allowing the projector 106 and the camera 108 to access different projection surfaces in the environment 100. As such, the system parameters maintained in the datastore 132 may include current pan and tilt settings of the camera and projector, an indication of content that the ARFN 102 is currently projecting or otherwise outputting, and the like.

EXAMPLE ARFN

FIG. 2 shows additional details of an example ARFN 102 that may be configured to project a user interface (UI), identify when a user attempts to interact with the UI, and provide feedback to the user indicating that the user has engaged the UI, as described above with reference to FIG. 1. The ARFN 102 is configured to scan at least a portion of a scene 202 and the objects therein. The ARFN 102 may also be configured to provide output, such as images, sounds, and so forth.

A chassis 204 holds the components of the ARFN 102. One or more projectors 106 may be disposed within the chassis 204 and may be configured to generate and project images into the scene 202. These images may be visible light images perceptible to the user, visible light images imperceptible to the user, images with non-visible light, or a combination thereof. This projector 106 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The projector 106 has a projector field of view 206 which describes a particular solid angle. The projector field of view 206 may vary according to changes in the configuration of the projector. For example, the projector field of view 206 may narrow upon application of an optical zoom to the projector.

One or more cameras 108 may also be disposed within the chassis 204. The camera 108 is configured to image the scene in visible light wavelengths, non-visible light wavelengths, or both. The camera 108 has a camera field of view 208 that describes a particular solid angle. The camera field of view 208 may vary according to changes in the configuration of the camera 108. For example, an optical zoom of the camera may narrow the camera field of view 208.

In some implementations, a plurality of cameras 108 may be used. For instance, one embodiment of the ARFN 102 may include a three-dimensional (3D), infrared (IR) camera and a red-green-blue (RGB) camera. The 3D, IR camera may be configured to capture information for detecting depths of objects within the scene 202, while the RGB camera may be configured to detect edges of objects by identifying changes in color within the scene 202. In some instances, a single camera may be configured to perform these functions.

The chassis 204 may be mounted with a fixed orientation, or may be coupled via an actuator to a fixture such that the chassis 204 may move. Actuators may include piezoelectric actuators, motors, linear actuators, and other devices configured to displace or move the chassis 204 or components therein such as the projector 106 and/or the camera 108. For example, in one implementation the actuator may comprise a pan motor 210, a tilt motor 212, a roll motor 214, and so forth. The pan motor 210 is configured to rotate the chassis 204 in a yawing motion. The tilt motor 212, meanwhile, is configured to change the pitch of the chassis 204. The roll motor 214 is configured to move the chassis 204 in a rolling motion. By panning, tilting, and/or rolling the chassis 204, different views of the scene may be acquired.

One or more microphones 216 may be disposed within the chassis 204, or elsewhere within the scene 202. These microphones 216 may be used to acquire input from the user, may be used to determine the location of a sound, or may be used to otherwise aid in the characterization of and receipt of input from the scene. For example, the user may make a particular noise, such as a tap on a wall or snap of the fingers, which are pre-designated as attention command inputs. The user may alternatively use voice commands. Such audio inputs may be located within the scene using time-of-arrival differences among the microphones and used to summon an active zone within the augmented reality environment.

One or more speakers 218 may also be present to provide for audible output. For example, the speakers 218 may be used to provide output from a text-to-speech module or to playback pre-recorded audio.

A transducer 220 may also reside within the ARFN 102, or elsewhere within the environment, and may be configured to detect and/or generate inaudible signals, such as infrasound or ultrasound. These inaudible signals may be used to provide for signaling between accessory devices and the ARFN 102.

The ARFN 102 may also include a ranging system 222. The ranging system 222 is configured to provide distance information from the ARFN 102 to a scanned object or a set of objects. The ranging system 222 may comprise radar, light detection and ranging (LIDAR), ultrasonic ranging, stereoscopic ranging, and so forth. In some implementations the transducer 220, the microphones 216, the speaker 218, or a combination thereof may be configured to use echolocation or echo-ranging to determine distance and spatial characteristics.

In this illustration, the computing device 104 is shown within the chassis 204. However, in other implementations all or a portion of the computing device 104 may be disposed in another location and coupled to the ARFN 102. This coupling may occur via wire, fiber optic cable, wirelessly, or a combination thereof. Furthermore, additional resources external to the ARFN 102 may be accessed, such as resources in another ARFN 102 accessible via a local area network, cloud resources accessible via a wide area network connection, or a combination thereof. In still other instances, the ARFN 102 may couple to and control other devices within the environment, such as televisions, stereo systems, lights, and the like.

FIG. 2 also illustrates a projector/camera linear offset designated as "O". This is a linear distance between the projector 106 and the camera 108. Placement of the projector 106 and the camera 108 at a distance "O" from one another may aid in the recovery of structured light data from the scene. The known projector/camera linear offset "O" may also be used to calculate distances, dimensioning, and otherwise aid in the characterization of objects within the scene 202. In other implementations the relative angle and size of the projector field of view 206 and camera field of view 208 may vary. Also, the angle of the projector 106 and the camera 108 relative to the chassis 204 may vary.

In other implementations, the components of the ARFN 102 may be distributed in one or more locations within the environment 100. As mentioned above, microphones 216 and speakers 218 may be distributed throughout the scene. The projector 106 and the camera 108 may also be located in separate chasses 204. The ARFN 102 may also include discrete portable signaling devices used by users to issue command attention inputs. For example, these may be acoustic clickers (audible or ultrasonic), electronic signaling devices such as infrared emitters, radio transmitters, and so forth.

Figure 3:
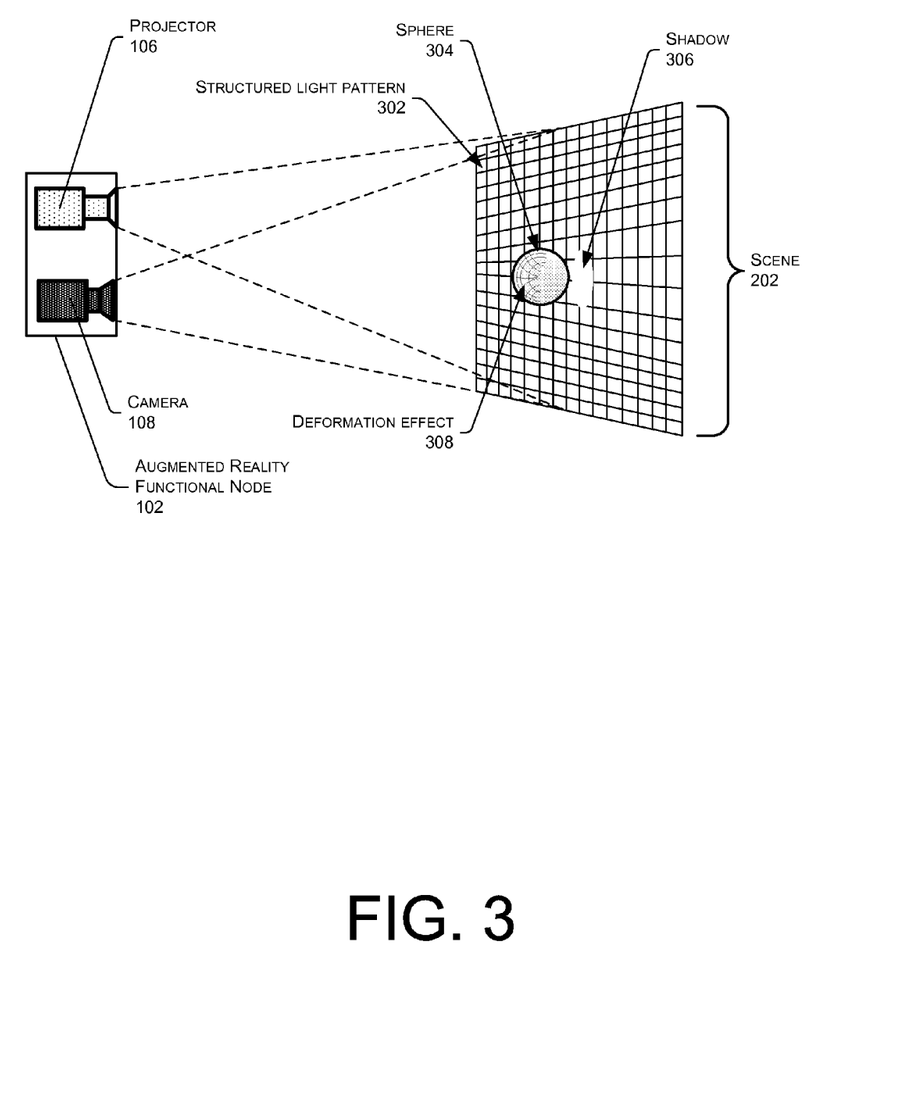
FIG. 3 is an illustrative diagram of the ARFN using structured light to identify surfaces, objects, and user interactions within an environment. By identifying user interactions, the ARFN is able to determine when a user attempts to interact with a projected UI and, in response, may provide feedback to the user.

FIG. 3 is an illustrative diagram of the ARFN 102 using structured light to identify surfaces, objects, users, and user gestures within an environment. However, while the structured light techniques described herein provide one example for identifying these surfaces, objects, users, and user gestures within a scene, it is to be appreciated that this information may be determined in other manners in other embodiments.

In the instant illustration, the projector 106 projects a structured light pattern 302 onto the scene 202. In some implementations a sequence of different structured light patterns 302 may be used. In other implementations, other devices such as general room lighting may generate structured light patterns. A light fixture, bulb, and so forth may be configured such that emitted light contains one or more modulated structured light patterns 302. For example, two structured light patterns may be presented, each at a different non-visible wavelength within the structure of an incandescent bulb.

The cameras 108 used to detect the structured light may also be incorporated into bulbs or assemblies suitable for installation in existing light fixtures. These assemblies may be configured to communicate with the computing device 104 wirelessly or via transmission of a signal via the household electrical wiring. In some implementations, the assembly may provide pre-processing of input prior to sending data along to the computing device 104.

This structured light pattern 302 may be in wavelengths that are visible to the user, non-visible to the user, or a combination thereof. The structured light pattern 302 is shown in this example as a grid for ease of illustration and not as a limitation. In other implementations other patterns, such as bars, dots, pseudorandom noise, and so forth may be used. Pseudorandom Noise (PN) patterns are useful as structured light patterns because a particular point within the PN pattern may be specifically identified. A PN function is deterministic in that given a specific set of variables, a particular output is defined. This deterministic behavior allows for specific identification and placement of a point or block of pixels within the PN pattern. In some implementations, a plurality of structured light patterns 302 may be used to image the scene. These may include different PN patterns, geometric shapes, and so forth.

For illustrative purposes, a sphere 304 is shown positioned between the projector 106 and a wall in the scene 202. A shadow 306 from the sphere 304 appears on the wall. Inspection of the sphere 304 shows a deformation or distortion effect 308 of the structured light pattern 302 as it interacts with the curved surface of the sphere 304.

In some implementations other effects, such as dispersion of the structured light pattern 302, may be used to provide information on the topology of the scene. Where the projector 106 and camera 108 have differing fields of view, such as shown in FIG. 2, the dispersion or change in the "density" of the structured light pattern 302 may be used to determine depth of field.

The camera 108 detects the interaction of the structured light pattern 302 with objects within the scene. For example, the deformation effect 308 on the sphere 304 is detected by the camera 108. The camera may similarly identify deformation effects on users within the environment and may utilize this information to identify user gestures and how trajectories of these gestures. That is, the camera 108 may identify, via deformation in the structured light, a location of a selection tool (e.g., a user's finger) as this location changes over time. The ARFN 102 may then use these locations tracked over time to identify a trajectory of the gesture.

EXAMPLE FEEDBACK FOR PROJECTED USER INTERFACES

Figure 4A:
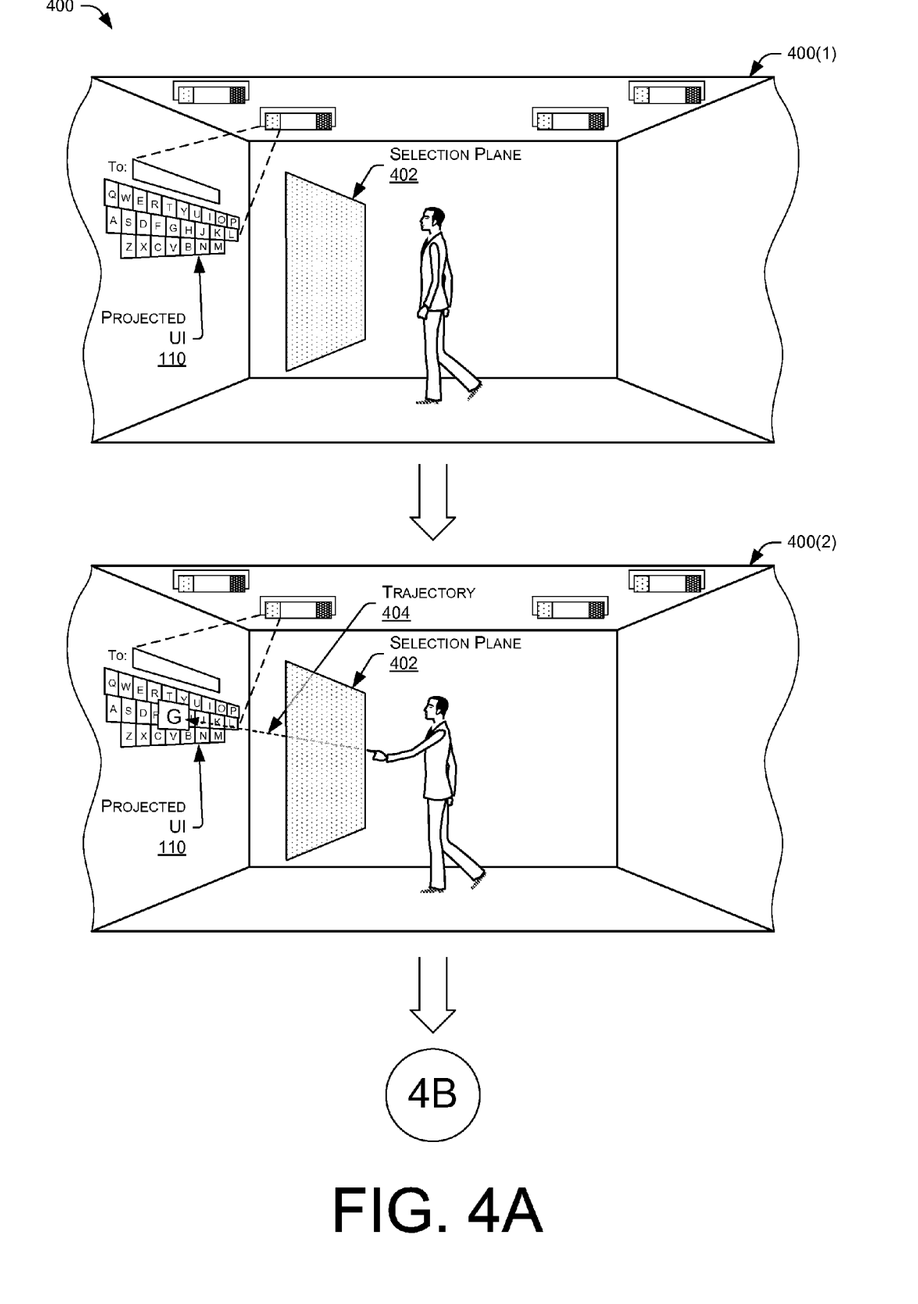
FIGS. 4A-4C collectively illustrate an example flow diagram of an ARFN projecting a UI, a user attempting to interact with the UI, the AFRN providing feedback to the user in response, the user making a selection of a portion (here, a key) of the UI, and the ARFN providing feedback indicating acceptance of this selection.
Figure 4B:
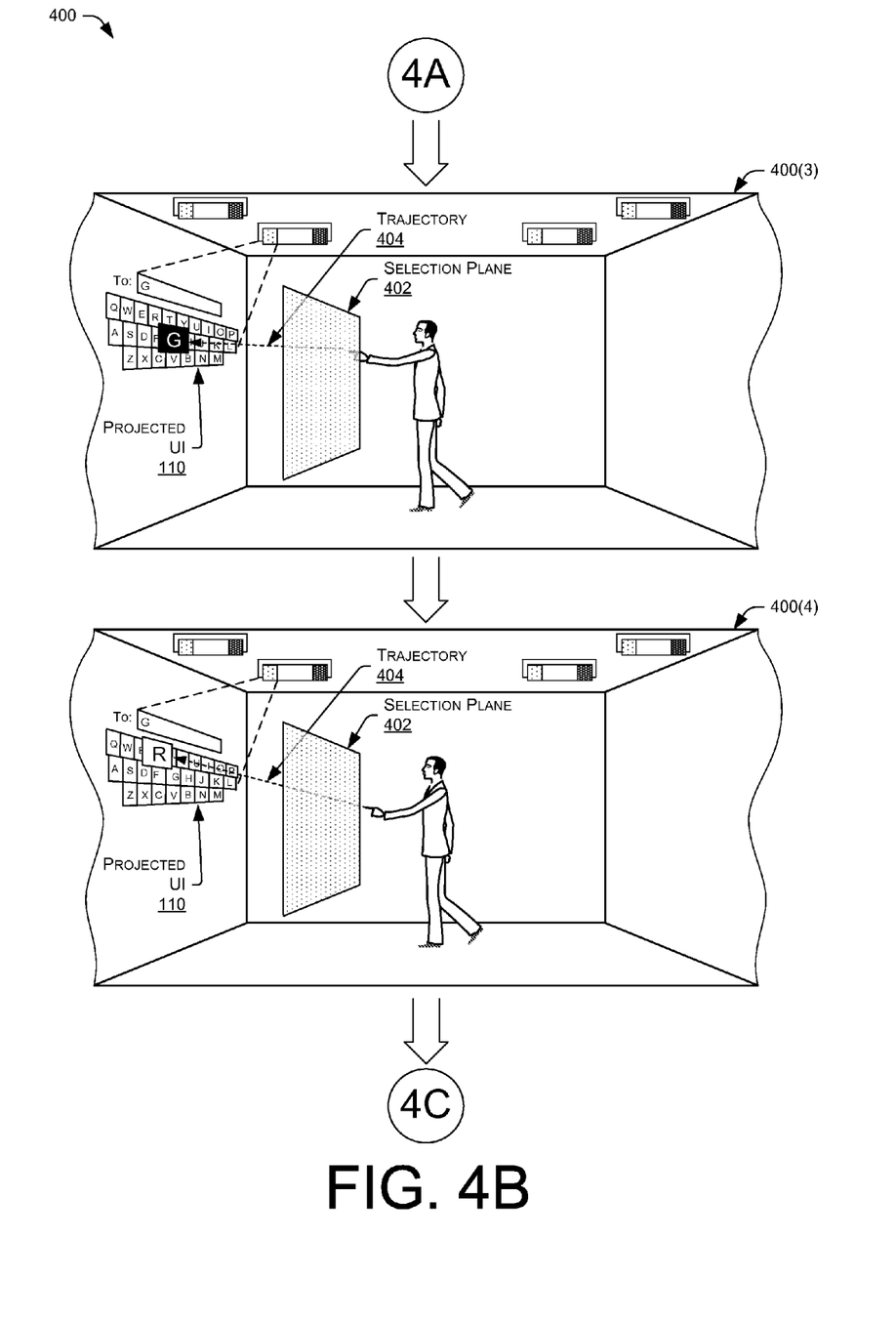
Figure 4C:
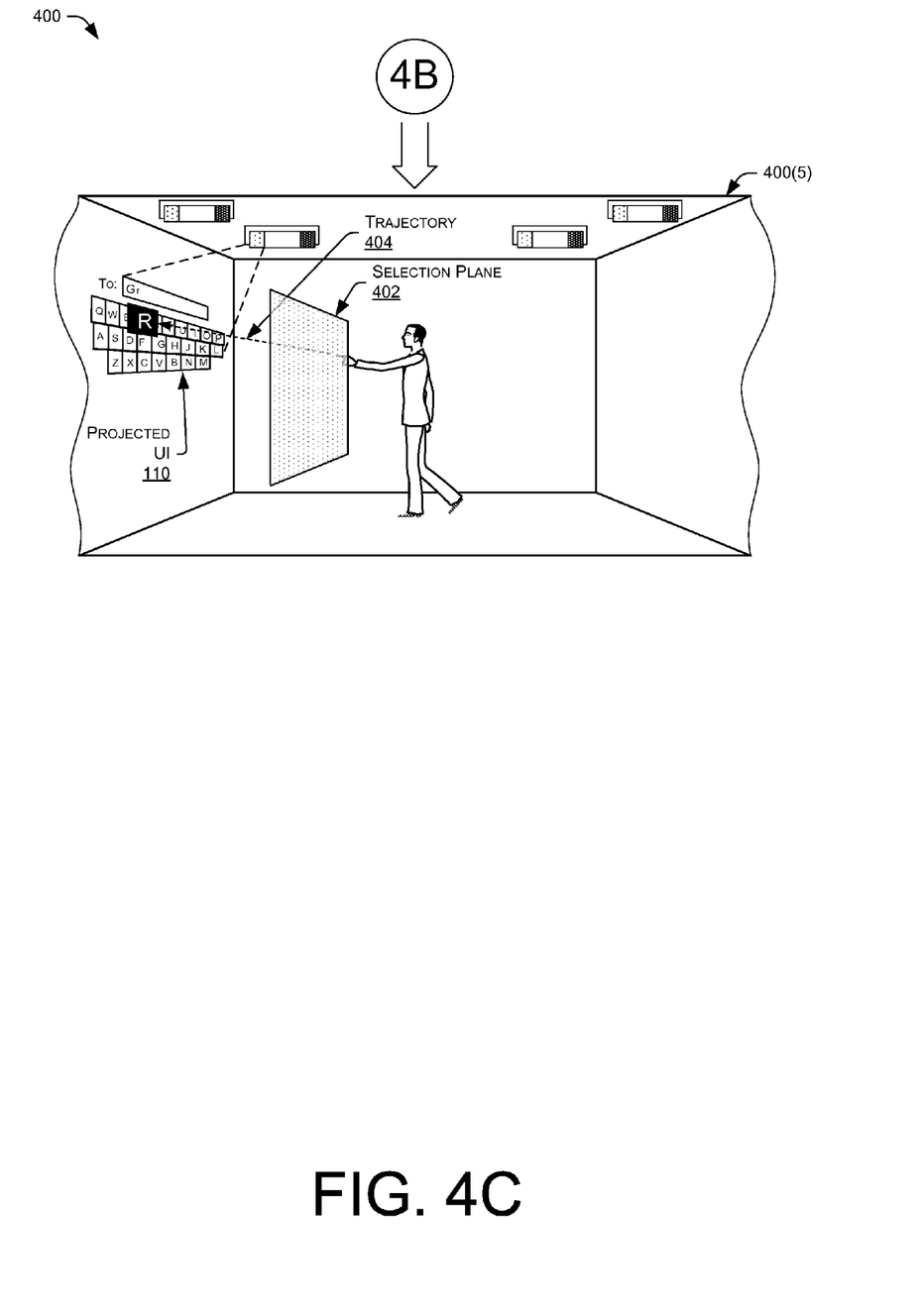

FIGS. 4A-4C collectively illustrate an example flow diagram 400 of an ARFN projecting a UI and a user attempting to interact with the UI. In response, the AFRN provides feedback to the user. Furthermore, the flow diagram 400 illustrates the user making a selection of a portion (here, a key) of the UI and the ARFN providing feedback indicating acceptance of this selection.

At 400(1), an ARFN 102 within the illustrated environment projects the user interface (UI) discussed above with reference to FIG. 1. While this projected UI comprises a keyboard in this example, the UI 110 may comprise any other type of UI that includes one or more selectable portions (e.g., keys, icons, etc.) in other instances. As illustrated, in this example the projected UI 110 also includes a text box into which the user is typing.

FIG. 4A also illustrates a virtual selection plane 402 that the ARFN 102 may reference when determining whether or not a user is making a selection of a key on the UI 110 using a gesture. That is, the ARFN 102 may define a plane that is substantially parallel to the surface on which the UI 110 is projected and, when pierced by a gesture of the user, results in a selection being made on the projected UI 110.

The ARFN 102 may define the selection plane 402 relative to the wall on which the UI is projected, relative to the user interacting within the UI, or in any other manner. For instance, the ARFN 102 may define the plane 402 as a certain distance from the wall or a certain distance from the user in the direction of the wall. In some instances, the user may define the location of the selection plane 402 by, for example, providing an audible command or a gesture to the ARFN 102 indicating a distance of the selection plane 402 from the user. Of course, in each of these instances it is to appreciated that the selection plane might not be visually perceptible to the user but instead represents a depth within the environment at which the ARFN 102 will interpret a gesture of the user as making a selection on the projected UI 110.

When the user makes a gesture towards the wall but prior to piercing to the selection plane 402, the ARFN 102 may provide feedback to the user indicating which portion (e.g., key) of the UI 110 the user is in position to select. Thereafter, if the user's gesture continues moving towards that portion when the gesture pierces the virtual selection plane 402, the ARFN 102 will interpret the gesture as a selection of that portion of the UI.

At 400(2), for instance, the user has begun making a gesture with his finger toward the projected UI, but has not yet past the selection plane 402. In response, the ARFN 102 may utilize structured light or other depth-sensing techniques to identifying a trajectory 404 of the user's gesture. That is, the ARFN 102 may track a location of the user's finger (e.g., a centroid of the finger) over multiple different frames captured by the camera. The ARFN 102 may then connect these points and extrapolate the resulting path onto the wall on which the UI 110 is projected.

In this example, the trajectory 404 extrapolates to the "G" key of the projected UI 110. Because of this, and because the user's finger has not yet pierced the selection pane 402, the ARFN 102 has provided feedback to the user indicating that the user is in position to select the "G" key on the keyboard. In this example, the ARFN 102 provides this feedback by enlarging the "G" key, although the ARFN 102 may provide the feedback in any of the manners described above. Because the ARFN 102 provides this feedback, the user is able to see that he is in position to select the "G" key. If this is the key that the user intends to select then he may continue moving his finger toward the "G" to make the selection. If, however, he intends to select a different key, then the user may move his finger up, down, left, or right according to which key the user intends to select. As the user does so, the ARFN 102 may enlarge or otherwise accentuate different keys of the keyboard according to the current trajectory 404 of the user's finger.

FIG. 4B continues the illustration of the flow diagram 400 and includes, at 400(3), the user continuing to move his finger towards the "G" key and past the selection plane 402. Because the ARFN 102 has detected that the user's gesture has exceeded the selection plane 402 while the trajectory 404 remains directed toward the "G" key, the ARFN 102 interprets the user's gesture as a selection of the "G" key. In response, the ARFN 102 may provide feedback to the user indicating that the ARFN 102 has accepted the user's selection. The ARFN 102 may also cause performance of an action associated with the selection. Here, for instance, the ARFN 102 has visually altered the "G" key to indicate the selection and has projected the letter "G" into the text box of the UI in which the user is typing. In other instances, the ARFN 102 may additionally or alternatively output an audible sound to indicate to the user that the user's selection of the "G" key has been accepted. This may comprise an audible indication of the letter "G", a sound that resembles a click, buzz, or ding, or any other type of sound. These sounds may be custom to particular buttons to allow users to associate the sounds with particular keys, similar to the different tones used when selecting numbers on a dial pad of a telephone.

While the ARFN 102 designates the user's gesture as a selection by crossing the selection plane 402 in this example, in other instances the ARFN 102 may designate a user's gesture as a selection based on other inputs from the from the user. For instance, the ARFN 102 may designate the user's gesture as a selection in response to the user first directing a gesture towards the UI 110 and, thereafter, back away from the UI 110. That is, as the user points toward a particular portion of the UI 110, such as the "G" key, the ARFN may indicate (visually, audibly, etc.) that the user is in position to select the "G" key. If the user thereafter continues moving toward the "G" key, the ARFN may interpret this continued gesture as a selection. In another example, after the ARFN highlights the "G" key, the user may move his finger toward the "G" key and then back away from the "G" key. The ARFN may interpret this directional change as a selection of the "G" key and may correspondingly indicate acceptance of this selection and/or cause performance of an action associated with this selection. In some instances, the selection may additionally or alternatively be based on a velocity and/or acceleration of the user's finger (or other selection tool) towards and/or away from the surface.

In still other examples, the microphones of the ARFN 102 may identify an audible command received from the user while the user points at the "G" key. In other instances, the user may select this key via any other visual or audible gesture.

At 400(4), meanwhile, the flow diagram 400 illustrates the user moving his hand away from the "G" key and to another desired key. As the trajectory 404 of the user's finger changes from the "G" key and to other keys on the keyboard, the ARFN 102 may provide feedback indicating that the user is in position to select these keys. In this example, for instance, as the user changes the trajectory 404 of his finger to move across the display, the ARFN 102 may enlarge different ones of the keys as the user's finger points at these keys. In the illustrated example, the user points his finger at the "R" key and, as such, the ARFN 102 has provided feedback indicating that the user is in position to select the "R" key.

FIG. 4C continues the illustration of the flow diagram 400 and includes, at 400(5), the user moving his finger through the selection plane 402 while the trajectory 404 remains on the "R" key. As such, the ARFN 102 interprets the user's gesture as a selection and, therefore, the ARFN 102 provides feedback to the user indicating acceptance of the selection by visually altering the appearance of the "R" key and by projecting the letter "r" into the text box in which the user types. With use of the techniques shown in the flow diagram 400, the ARFN 102 indicates to the user which portions of the UI 110 the user is in position to select to allow the user to interact within the UI 110 in a more effective and accurate manner.

Figure 5A:
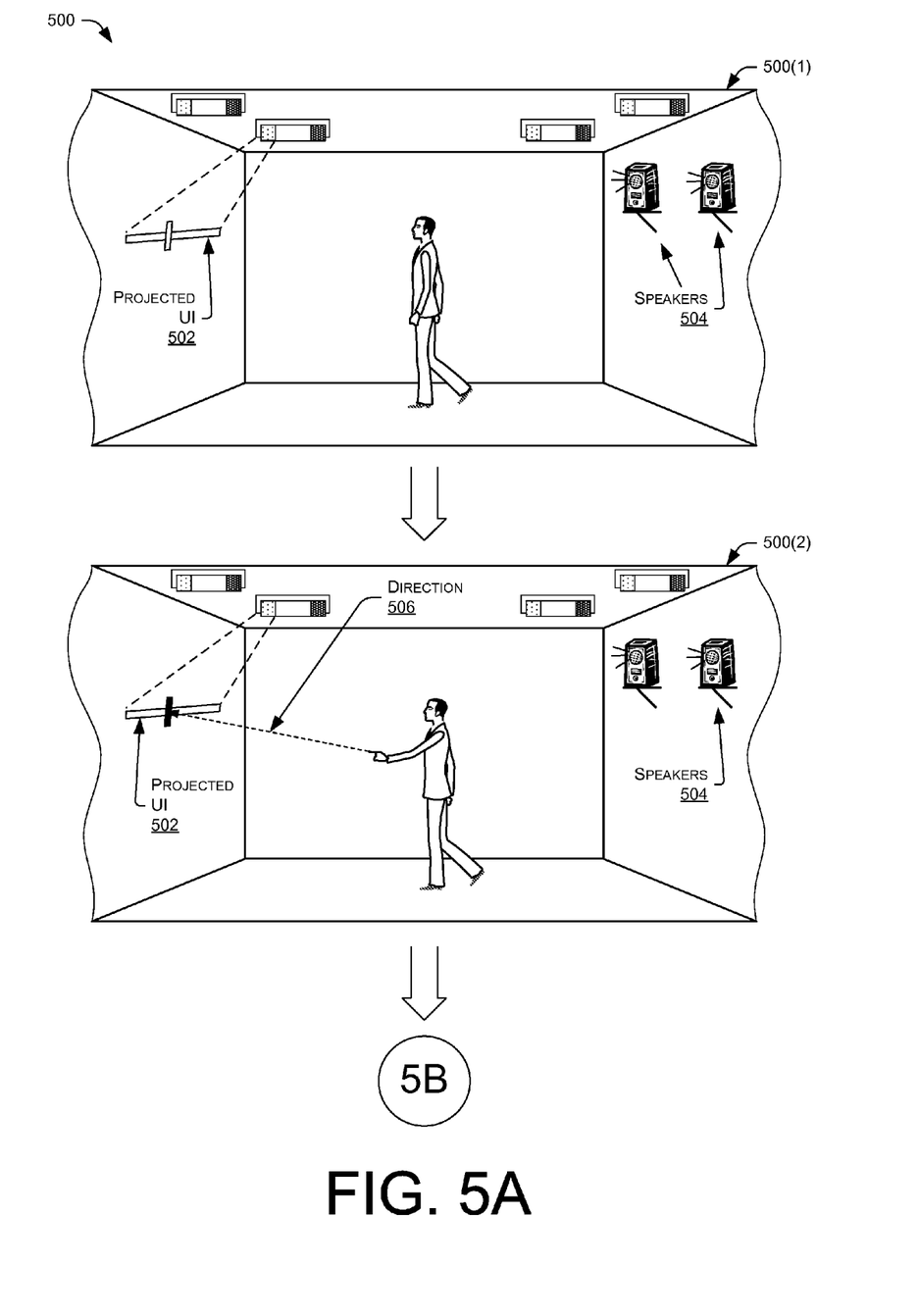
FIGS. 5A-5B collectively illustrate an example flow diagram of the ARFN projecting a different UI, the user interacting with the different UI, and, in response, the ARFN providing feedback and performing an action in accordance with the user's interaction. Here, the ARFN turns up the volume of sound emitted by speakers within the environment.
Figure 5B:
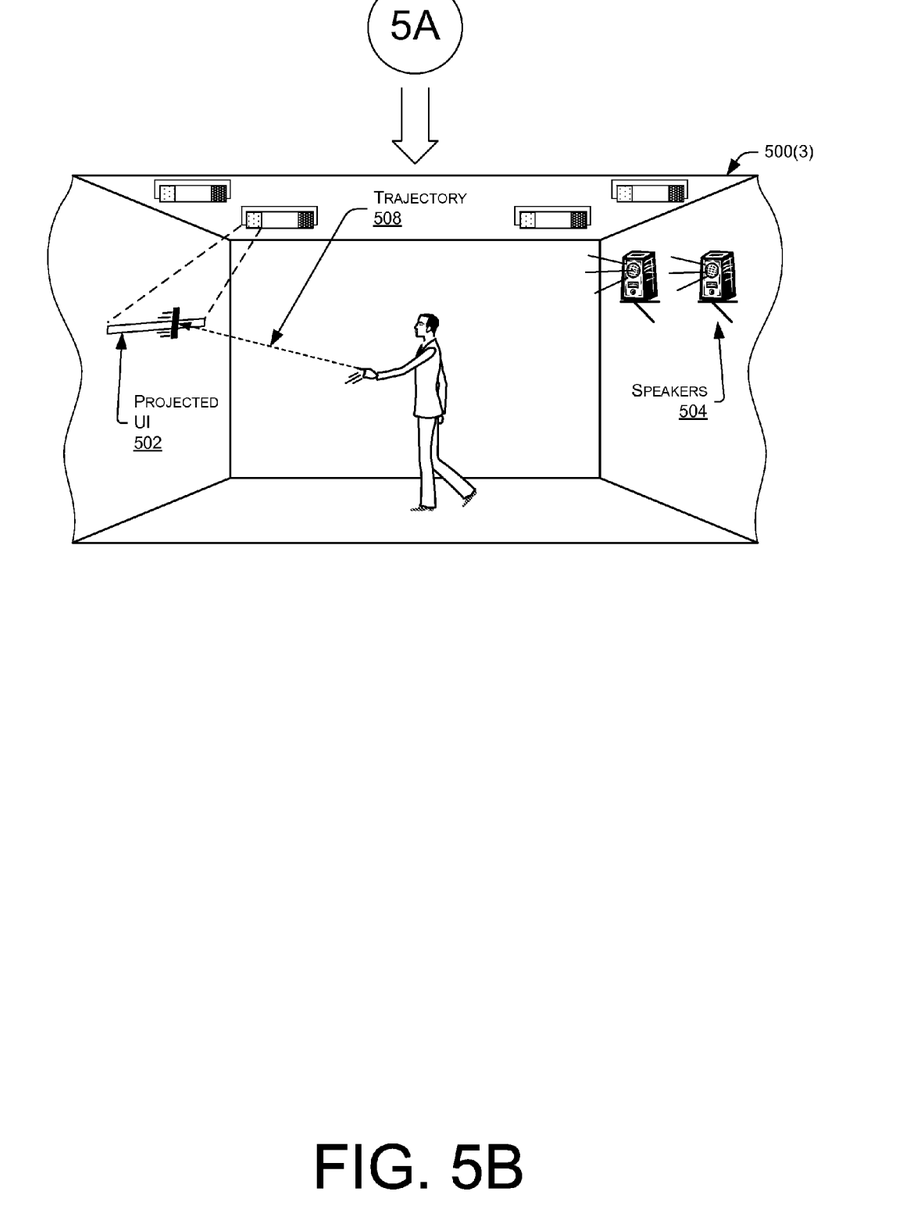

FIGS. 5A-5B collectively illustrate an example flow diagram 500 of the ARFN 102 projecting a different UI 502, which in this example comprises a slider bar that is operable by the user to modify a volume of sound being output by speakers 504 within the environment. As such, the ARFN 102 may both project the UI, interpret feedback from the user to modify the volume via the UI, and then instruct the speakers or a stereo system associated with the speakers to alter the volume accordingly. While the flow diagram 500 illustrates one potential UI and one potential type of device controlled by the UI, it is to be appreciated that the techniques apply to multiple other types of UIs and other types of devices.

At 500(1), the flow diagram 500 illustrates that the ARFN 102 projects the UI 502 onto the wall within the environment. At 500(2), the user gestures toward the wall using a selection tool, which in this instance again comprises the user's finger. The ARFN 102 here identifies a direction 506 in which the user points. That is, the ARFN 102 identifies, using one or more images obtained by the camera, that the user is pointing at or within a threshold distance of the slider of the slider bar. In response to identifying the gesture and determining that direction 506 of the gesture is onto the slider (e.g., via deformation in projected structured light), the ARFN 102 provides feedback to the user indicating that the user has engaged the UI prior to the user actually modifying a setting associated with the UI 502. In this example, the ARFN 102 has altered a color of a slider of the slider bar, thus indicating that the user is now able to move the slider left or right on the slider bar.

FIG. 5B continues the illustration of the flow diagram 500. At 500(3), the ARFN 102 detects that a trajectory 508 of the user's finger or hand is to the right. In response, the ARFN 102 has moved the slider to the right on the slider bar as projected onto the wall within the environment. In addition, the ARFN 102 has also performed an action in association with this selection. Here, the ARFN 102 has instructed the speakers or a stereo system associated with the speakers to increase the volume of sound being output by the speakers 504.

EXAMPLE PROCESS

Figure 6:
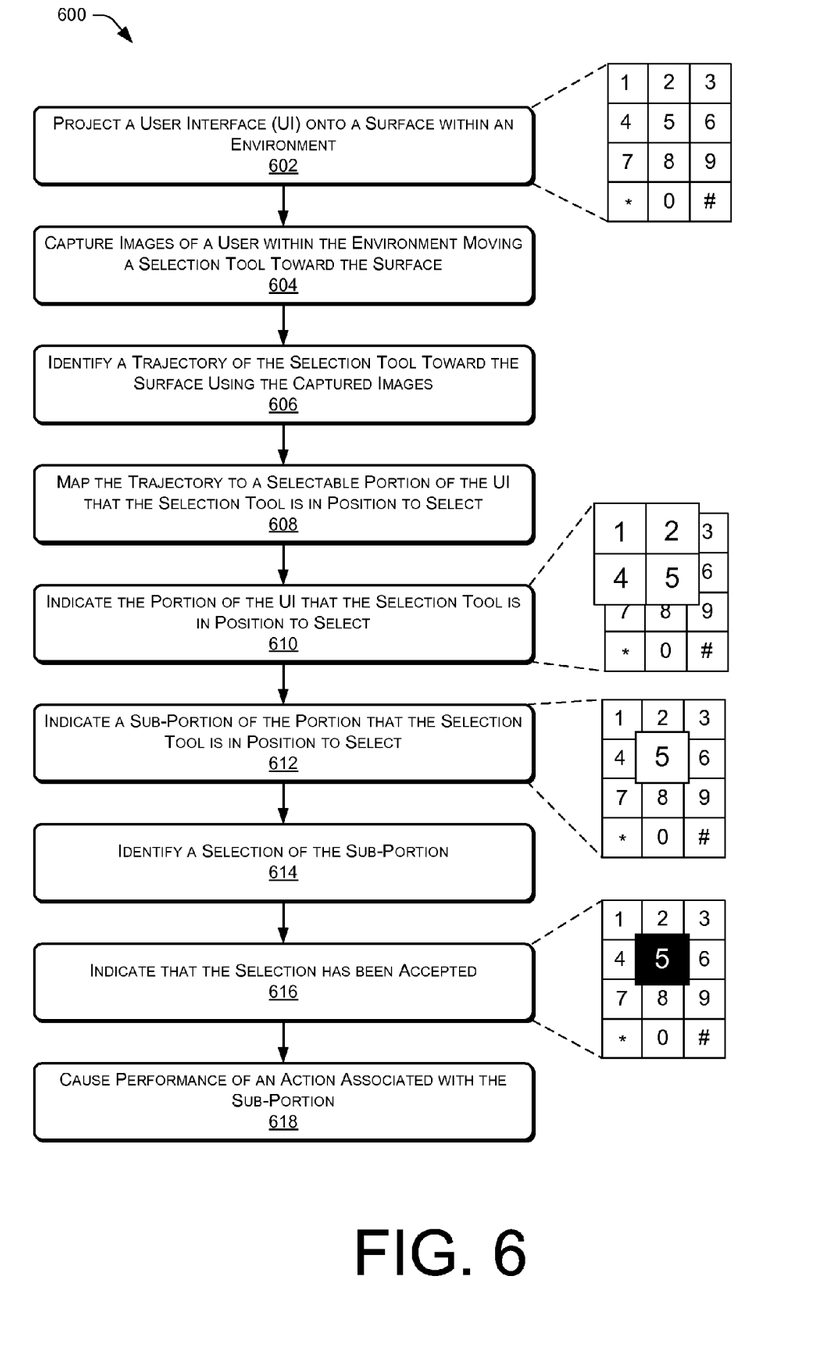
FIG. 6 illustrates an example process that includes identifying a user moving a selection tool towards a surface on which a UI is projected, mapping a trajectory of the selection tool to a portion of the UI, and indicating this portion of the UI to the user.

FIG. 6 illustrates an example process 600 that includes identifying a user moving a selection tool towards a surface on which a UI is projected, mapping a trajectory of the selection tool to a portion of the UI, and indicating this portion of the UI to the user. The process 600 (as well as other processes described in this disclosure) may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

The process 600 includes, at 602, projecting a user interface (UI) onto a surface within an environment. The UI may include multiple different selectable portions (e.g., keys, icons, sliders, etc.) in some instances. In this example, the process 600 projects a dial pad comprising different numbers for selection. At 604, the process 600 captures images of a user within the environment moving a selection tool toward the surface. The selection tool may comprise a hand or finger of the user or an object held by the user. At 606, the process 600 identifies a trajectory of the selection tool toward the surface using the captured images.

At 608, the process 600 then maps the identified trajectory to a portion of the user interface that the selection tool is in position to select. After the mapping, at 610 the process 600 then indicates which portion of multiple different portions of the user interface the selection tool is in position to select. For instance, the ARFN 102 described above may visually alter the UI (e.g., change a color of the portion, enlarge the portion, gray out other portions, etc.), may provide audible feedback, may provide haptic feedback (e.g., forced air directed at the user's finger from the ARFN 102), or may provide feedback in another manner. In this example, the process 600 has mapped the trajectory to a particular block of keys (1, 2, 4, and 5) of the dial pad and has enlarged this block of keys relative to other keys of the dial pad.

In some instances, one or more portions of the UI may include multiple different sub-portions. For instance, as a user gestures towards the surface, the ARFN 102 may accentuate a block of multiple keys, icons or the like, as the figure illustrates. At 612, the process 600 continues to monitor the trajectory of the selection tool and, based on the trajectory, indicates which sub-portion of the multiple sub-portions the selection tool is in position to select. For instance, after accentuating the block of keys, the ARFN 102 may identify one key of multiple keys that the user's trajectory maps to and, after the identifying, may provide feedback that the user is in condition to select this key. Here, for example, the process 600 has indicated that the selection tool is in position to select the "5" key from the previously enlarged block of keys. Of course, while the process 600 describes providing feedback for two layers of a UI, other implementations may provide feedback at any other level of granularity or even continuously.

At 614, the process 600 identifies, with reference to the selection tool's trajectory, the user making a selection of the indicated sub-portion. At 616, the process 600 provides feedback indicating acceptance of this selection and, at 618, the process 600 may cause performance of an action associated with the sub-portion (e.g., the selected key or icon).

Figure 7:
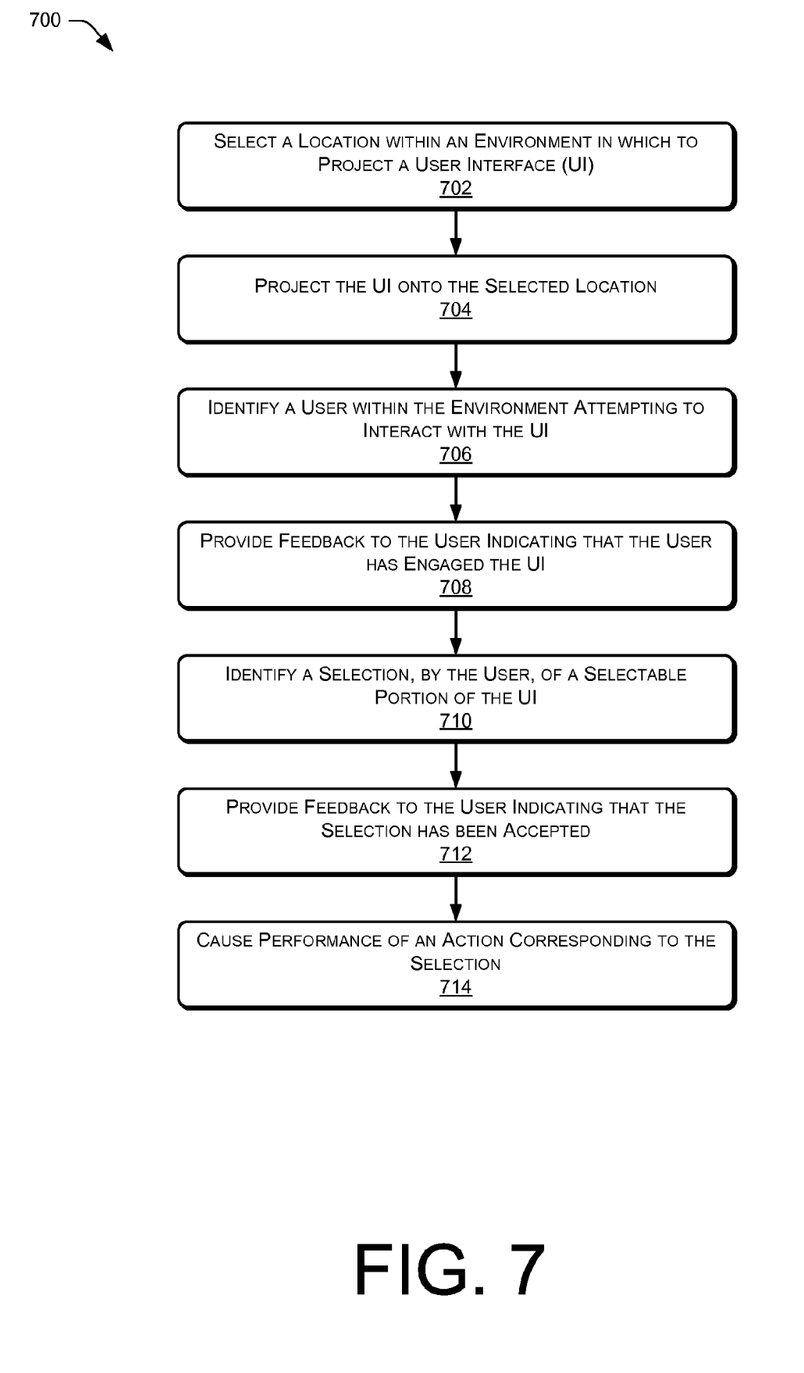
FIG. 7 illustrates an example process that includes identifying a user attempting to interact with a UI projected within an environment and, in response, providing feedback to the user indicating that the user has engaged the UI.

FIG. 7 illustrates another example process 700. At 702, the process 700 selects a location within an environment in which to project a UI. For instance, the ARFN 102 may receive a request from a user to project a particular UI (e.g., keyboard, keypad, slider bar, television control, etc.) and may select a location to project the UI relative to the user. For instance, the ARFN 102 may characterize the environment using structured light to identify a flat surface near the user and may project the UI onto this surface that is adjacent to the user. In another example, the user may explicitly select the location by providing a command to the ARFN via an audible or physical gesture.

At 704, the process 700 then projects the UI onto the selected location within the environment and, at 706, the process 700 identifies the user within the environment attempting to interact with the UI. This may include receiving an audible command from the user, identifying the user moving a selection tool towards the UI, or the like. At 708, the process 700 provides feedback to the user indicating that the user has engaged the UI. For instance, the ARFN 102 may visually alter the projected UI, may output a sound, or may provide haptic feedback to the user. In some instances, the process 700 provides the feedback prior to the user selecting a selectable portion of the UI (e.g., before the user selects a key of a keyboard) or prior to the user altering a selectable portion of the UI (e.g., before the user moves a slider along a slider bar).

At 710, the process 700 identifies a selection of a selectable portion of the UI made by the user. For instance, the user may have selected to modify a slider on a slider bar, may have selected a key from a keyboard or keypad, or the like. At 712, and in response to identifying the selection, the process 700 provides feedback to the user indicating that the user's selection has been accepted. Finally, at 714, the process 700 causes performance of an action corresponding to the selection.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   one or more processors;
   a projector, coupled to the one or more processors and configured to project, onto a surface and within an environment, a user interface that includes multiple selectable portions;
   a camera, coupled to the one or more processors and configured to capture information for identifying a user within the environment interacting with the user interface; and
   one or more computer-readable media storing computer-executable instructions that, when executed by the one or more processors, cause the one or more processors to perform acts comprising:
      identifying, using the information captured by the camera, the user interacting with the user interface by moving a selection tool towards the surface;
      determining which of the multiple selectable portions the user is in position to select based at least in part on the identifying;
      altering the user interface projected by the projector to highlight the determined selectable portion; and
      identifying, using the information captured by the camera, the user selecting the determined selectable portion, the identifying of the user selecting the determined selectable portion comprising at least one of: (1) identifying the user selecting the determined selectable portion in response to the user moving the selection tool toward the surface and past a predefined selection plane without touching the surface, or (2) identifying the user selecting the determined selectable portion in response to the user moving the selection tool toward the surface, without touching the surface, and then back away from the surface.

2. A system as recited in claim 1, wherein the altering comprises causing the projector to enlarge a size of the determined selectable portion.

3. A system as recited in claim 1, wherein the altering comprises causing the projector to alter a color of the determined selectable portion.

4. A system as recited in claim 1, further comprising one or more speakers to output audible content within the environment, and wherein the acts further comprise indicating, using the one or more speakers, that the user is in position to select the determined selectable portion.

5. A system as recited in claim 1, wherein:
   the identifying the user interacting with the user interface comprises identifying the user moving the selection tool toward the surface.

6. The system of claim 1, wherein:
   the determining comprises determining a trajectory of the selection tool toward the surface and extrapolating the trajectory onto the determined selectable portion.

7. A system as recited in claim 1, the acts further comprising:
   instructing the projector to visually alter the determined selectable portion to indicate acceptance of the selecting.

8. A system as recited in claim 7, wherein:
   the identifying that the user is interacting with the user interface comprises identifying the user moving the selection tool toward the surface;
   the determining comprises determining a trajectory of the selection tool toward the surface and extrapolating the trajectory onto the determined selectable portion; and
   the identifying of the user selecting the determined selectable portion comprises identifying the user moving the selection tool towards the surface and along at least a portion of the trajectory after the projector has visually altered the user interface to highlight the determined selectable portion.

9. A system as recited in claim 1, the acts further comprising:
   causing performance of an action associated with the determined selectable portion.

10. One or more computer-readable storage media storing computer-executable instructions that, when executed by one or more processors, cause the one or more processors to perform acts comprising:
    projecting, with a projector, a user interface onto a surface within an environment;
    capturing, with a camera, images of a user within the environment moving a selection tool toward the surface;
    identifying a trajectory of the selection tool toward the surface using the captured images;
    highlighting a portion of multiple different portions of the user interface that corresponds to a position of the selection tool based at least in part on the identified trajectory; and
    identifying, using the captured images, the user selecting the portion of the user interface that corresponds to the position of the selection tool by at least one of: (1) identifying the user selecting the portion of the user interface that corresponds to the position of the selection tool in response to the user moving the selection tool toward the surface and past a predefined selection plane without touching the surface, or (2) identifying the user selecting the portion of the user interface that corresponds to the position of the selection tool in response to the user moving the selection tool toward the surface, without touching the surface, and then back away from the surface.

11. One or more computer-readable media as recited in claim 10, wherein the selection tool comprises one or more of a hand of the user, a finger of the user, or an object held by the user.

12. One or more computer-readable media as recited in claim 10, the acts further comprising mapping the identified trajectory to the portion of the user interface that corresponds to the position of the selection tool.

13. One or more computer-readable media as recited in claim 10, wherein the indicating comprises altering the user interface as projected onto the surface.

14. One or more computer-readable media as recited in claim 13, wherein the visually altering the user interface comprises one or more of enlarging the portion of the user interface that corresponds to the position of the selection tool or altering a color of the portion of the user interface that corresponds to the position of the selection tool.

15. One or more computer-readable media as recited in claim 10, wherein the indicating comprises audibly outputting an indication that the selection tool is in position to select the portion of the user interface.

16. One or more computer-readable media as recited in claim 10, wherein the portion that corresponds to the position of the selection tool includes multiple sub-portions, and the acts further comprise:
continuing to identify the trajectory of the selection tool toward the surface using captured images; and
indicating which sub-portion of the multiple sub-portions corresponds to the position of the selection tool based at least in part on the identified trajectory.

17. One or more computer-readable media as recited in claim 16, the acts further comprising:
continuing to identify the trajectory of the selection tool after indicating that the position of the selection tool corresponds to the sub-portion;
identifying a selection of the sub-portion of the portion of the user interface based at least in part on the identified trajectory; and
indicating that the selection of the sub-portion has been accepted.

18. One or more computer-readable media as recited in claim 17, wherein the indicating that the sub-portion has been selected comprises one or more of altering the user interface as projected onto the surface or outputting an audible indication that the sub-portion has been selected.

19. One or more computer-readable media as recited in claim 17, the acts further comprising causing performance of an action associated with the sub-portion at least partly in response to identifying the selection.

20. One or more computer-readable media as recited in claim 10, the acts further comprising:
determining that the position of the selection tool corresponds to a different portion of the multiple different portions of the user interface; and
indicating that the position of the selection tool corresponds to the different portion of the user interface at least partly in response to the determining.

21. A method, comprising:
projecting, with a projector, a user interface that includes multiple selectable portions onto a surface within an environment;
identifying, with a camera, a user within the environment attempting to interact with the user interface projected onto the surface by identifying the user moving a selection tool towards the surface;
identifying a trajectory of the selection tool toward the surface using the captured images;
visually highlighting a portion of multiple selectable portions of the user interface, the portion selected based at least in part on the trajectory of the selection tool; and
after visually highlighting the portion, identifying a selection of a key of the portion in response to the user continuing to move the selection tool towards the surface and past a selection plane without touching the surface.

22. A method as recited in claim 21, wherein:
the user interface comprises a virtual keyboard projected onto the surface and the one or more selectable portions comprise keys of the virtual keyboard; and
the feedback comprises visually highlighting one of the keys of the virtual keyboard that the user is in position to select.

23. A method as recited in claim 21, wherein:
the user interface comprises a virtual keyboard projected onto the surface and the one or more selectable portions comprise keys of the virtual keyboard; and
the feedback comprises visually highlighting a block of the keys of the virtual keyboard.

24. A method as recited in claim 21, wherein:
the user interface comprises a slider bar projected onto the surface and the one or more selectable portions comprises a slider of the slider bar; and
the feedback comprises visually highlighting the slider to indicate that the user is in position to move the slider along the slider bar.

25. A method as recited in claim 21, further comprising:
after providing the feedback, identifying a selection of one of the one or more selectable portions by the user; and
providing feedback to the user indicating that the selection has been accepted.

26. A method as recited in claim 25, wherein:
the identifying of the selection by the user comprises identifying that the user has continued moving the selection tool towards the surface and then back away from the surface.

27. A method as recited in claim 21, wherein the selection plane is defined relative to the user.

28. A method as recited in claim 21, wherein the selection plane is defined relative to the surface.

29. A method as recited in claim 21, wherein the user defines the selection plane.

30. A method as recited in claim 21, further comprising selecting, prior to the projecting, a location within the environment in which to project the user interface.

31. A method as recited in claim 30, wherein the location is selected relative to a location of the user within the environment.

32. A method as recited in claim 30, wherein the location is selected explicitly by the user.

* * * * *